United States Patent
Chi et al.

(10) Patent No.: US 11,466,710 B2
(45) Date of Patent: Oct. 11, 2022

(54) ACTUATING MECHANISM AND ELECTRONIC DEVICE

(71) Applicant: PEGATRON CORPORATION, Taipei (TW)

(72) Inventors: Chih-Heng Chi, Taipei (TW); Chih-Cheng Hsu, Taipei (TW)

(73) Assignee: PEGATRON CORPORATION, Taipei (TW)

(*) Notice: Subject to any disclaimer, the term of this patent is extended or adjusted under 35 U.S.C. 154(b) by 266 days.

(21) Appl. No.: 17/024,553

(22) Filed: Sep. 17, 2020

(65) Prior Publication Data

US 2021/0164504 A1 Jun. 3, 2021

(30) Foreign Application Priority Data

Dec. 3, 2019 (TW) .................. 108144059

(51) Int. Cl.
| | | |
|---|---|---|
| G06F 1/16 | (2006.01) | |
| H05K 5/02 | (2006.01) | |
| H05K 1/02 | (2006.01) | |
| F16B 1/04 | (2006.01) | |
| G06F 21/86 | (2013.01) | |
| G08B 13/06 | (2006.01) | |

(52) U.S. Cl.
CPC ............. *F16B 1/04* (2013.01); *G06F 1/1679* (2013.01); *H05K 5/0208* (2013.01); *G06F 21/86* (2013.01); *G08B 13/06* (2013.01); *H05K 1/0275* (2013.01); *H05K 5/0217* (2013.01)

(58) Field of Classification Search
CPC ...................................................... H05K 5/00
See application file for complete search history.

(56) References Cited

U.S. PATENT DOCUMENTS

2010/0123322 A1* 5/2010 Baragano Gonzalez .................. E05B 55/12 292/71
2015/0339568 A1* 11/2015 Nekoogar ............ H05K 1/0275 361/752

FOREIGN PATENT DOCUMENTS

| CN | 104112104 | 12/2016 |
| CN | 106503495 | 3/2017 |
| CN | 206601707 | 10/2017 |
| CN | 108052837 | 5/2018 |
| JP | H10293727 | 11/1998 |
| JP | 2004054995 | 2/2004 |
| JP | 2004110929 | 4/2004 |

OTHER PUBLICATIONS

"Search Report of Europe Counterpart Application", dated Apr. 23, 2021, pp. 1-6.

* cited by examiner

*Primary Examiner* — Jerry Wu
(74) *Attorney, Agent, or Firm* — J.C. Patents

(57) ABSTRACT

An actuating mechanism includes a target, a smasher, an elastic component, and a blocker. The smasher is movably disposed at a side of the target. The elastic component is configured to provide an elastic force to drive the smasher to move toward the target. The blocker is movably disposed corresponding to the smasher. When the blocker contacts the smasher, the blocker clamps the smasher. When the blocker is moved to a position where the clamping to the smasher is released, the smasher is driven by the elastic force to move toward and smash the target. An electronic device is also provided.

11 Claims, 11 Drawing Sheets

ACTUATING MECHANISM AND ELECTRONIC DEVICE

CROSS-REFERENCE TO RELATED APPLICATION

This application claims the priority benefit of Taiwan application serial no. 108144059, filed on Dec. 3, 2019. The entirety of the above-mentioned patent application is hereby incorporated by reference herein and made a part of this specification.

BACKGROUND

Technical Field

The disclosure relates to an actuating mechanism and an electronic device, and particularly relates to an actuating mechanism and an electronic device using the actuating mechanism.

Related Art

In common electronic devices such as notebook computers, smartphones, tablet computers, hard drives, servers, or other devices used for data computation or data storage, the electronic components used for data computation or data storage are mostly mounted in a case to prevent damage to the electronic components by foreign objects or prevent an ill-intentioned person from easily stealing the electronic components or information.

To prevent an ill-intentioned person from deliberately disassembling the case to steal the electronic components or information, corresponding protection mechanisms have been proposed to help determine whether the case has been deliberately disassembled and reassembled. Common protection mechanisms include bonding the case of an electronic device by using a one-time-use adhesive, mounting a moisture-reactive material inside the electronic device, or mounting a one-time-use wireless sensing element inside the electronic device. However, in the above protection mechanisms, the determination process is complicated or inaccurate determination is likely to occur.

SUMMARY

The disclosure provides an actuating mechanism which may be applied to a safety protection mechanism of an electronic device.

The disclosure provides an electronic device having a good safety protection mechanism.

The disclosure provides an actuating mechanism including a target, a smasher, an elastic component, and a blocker. The smasher is movably disposed at a side of the target. The elastic component provides an elastic force to drive the smasher to move toward the target. The blocker is movably disposed corresponding to the smasher. When the blocker contacts the smasher, the blocker clamps the smasher. When the blocker moves to a position where the clamping to the smasher is released, the smasher is driven by the elastic force to move toward the target and smash the target.

In an embodiment of the disclosure, the smasher includes a limiting part, and the blocker is located in a moving path of the limiting part to clamp the smasher. When the blocker moves out of the moving path of the limiting part, the blocker moves to a position where the clamping to the smasher is released, and the smasher is driven by the elastic force to move toward the target and smash the target.

In an embodiment of the disclosure, the actuating mechanism further includes a door plate movably disposed between the target and the smasher. The door plate has a through hole. In one mode, the smasher contacts the door plate, and the through hole is misaligned with the smasher and the target. In another mode, the through hole is aligned with the smasher and the target.

In an embodiment of the disclosure, the blocker is movably disposed between the target and the smasher. In one mode, the blocker contacts the smasher to clamp the smasher. In another mode, when the blocker moves away from the smasher to a position where the clamping to the smasher is released, the smasher is driven by the elastic force to move toward the target and smash the target.

In an embodiment of the disclosure, the blocker is movably disposed between the target and the smasher, and the blocker has a through hole. In one mode, the blocker contacts the smasher to clamp the smasher, and the through hole is misaligned with the smasher and the target. In another mode, when the blocker moves so that the through hole is aligned with the smasher and the target, the blocker moves to a position where the clamping to the smasher is released, and the smasher is driven by the elastic force to move toward the target and smashes the target after moving through the through hole.

The disclosure provides an electronic device including a first case, a second case, and an actuating mechanism. The second case is movably mounted at the first case. The actuating mechanism includes a target, a smasher, an elastic component, and a blocker. The target is disposed in the first case. The smasher is movably disposed in the first case and is located at a side of the target. Two ends of the elastic component are respectively connected to the smasher and the first case. The elastic component provides an elastic force to drive the smasher to move toward the target. One end of the blocker is connected to the second case. Another end of the blocker is located in the first case. The blocker is movably disposed corresponding to the smasher. When the blocker contacts the smasher, the blocker clamps the smasher. When the blocker moves along with the second case to a position where the clamping to the smasher is released, the smasher is driven by the elastic force to move toward the target and smash the target.

In an embodiment of the disclosure, the smasher includes a limiting part, and the blocker is located in a moving path of the limiting part to clamp the smasher. When the second case is disassembled from the first case, the blocker moves out of the moving path of the limiting part, the blocker moves to a position where the clamping to the smasher is released, and the smasher is driven by the elastic force to move toward the target and smash the target.

In an embodiment of the disclosure, the door plate is disposed in the first case.

In an embodiment of the disclosure, the first case has a locking protrusion. The door plate includes a body and an extension arm connected to the body, and the through hole penetrates the body. In one mode, the extension arm abuts against the locking protrusion, the smasher contacts the body, and the through hole is misaligned with the smasher and the target. In another mode, the extension arm passes by the locking protrusion, and the through hole is aligned with the smasher and the target.

In an embodiment of the disclosure, the blocker includes at least one engaging part and a blocking part, the engaging part is engaged with the second case, and the blocking part is movably disposed between the target and the smasher. In one mode, the blocking part contacts the smasher to clamp the smasher. In another mode, the second case is disassembled from the first case, and when the blocking part moves along with the second case to move away from the smasher to a position where the clamping to the smasher is released, the smasher is driven by the elastic force to move toward the target and smash the target.

In an embodiment of the disclosure, the blocker includes a blocking part and a mounting part, and the blocking part is located in the first case. The blocking part is movably disposed between the target and the smasher, and the through hole penetrates the blocking part. The mounting part extends into the first case and is engaged with the blocking part. In one mode, the mounting part is locked to the second case and the first case, the blocking part contacts the smasher to clamp the smasher, and the through hole is misaligned with the smasher and the target. In another mode, the mounting part is removed from the second case and the first case, the blocking part moves along with the mounting part so that the through hole is aligned with the smasher and the target, the blocking part moves to a position where the clamping to the smasher is released, and the smasher is driven by the elastic force to move toward the target and smashes the target after moving through the through hole.

Based on the above, the electronic device of the disclosure is integrated with the actuating mechanism, and based on whether the actuating mechanism is triggered or not, the relevant personnel can quickly and accurately determine whether the first case and the second case have been deliberately disassembled and reassembled. Therefore, the electronic device has a good safety protection mechanism.

To make the aforementioned more comprehensible, several embodiments accompanied with drawings are described in detail as follows.

DETAILED DESCRIPTION OF THE EMBODIMENTS

Figure 1A:
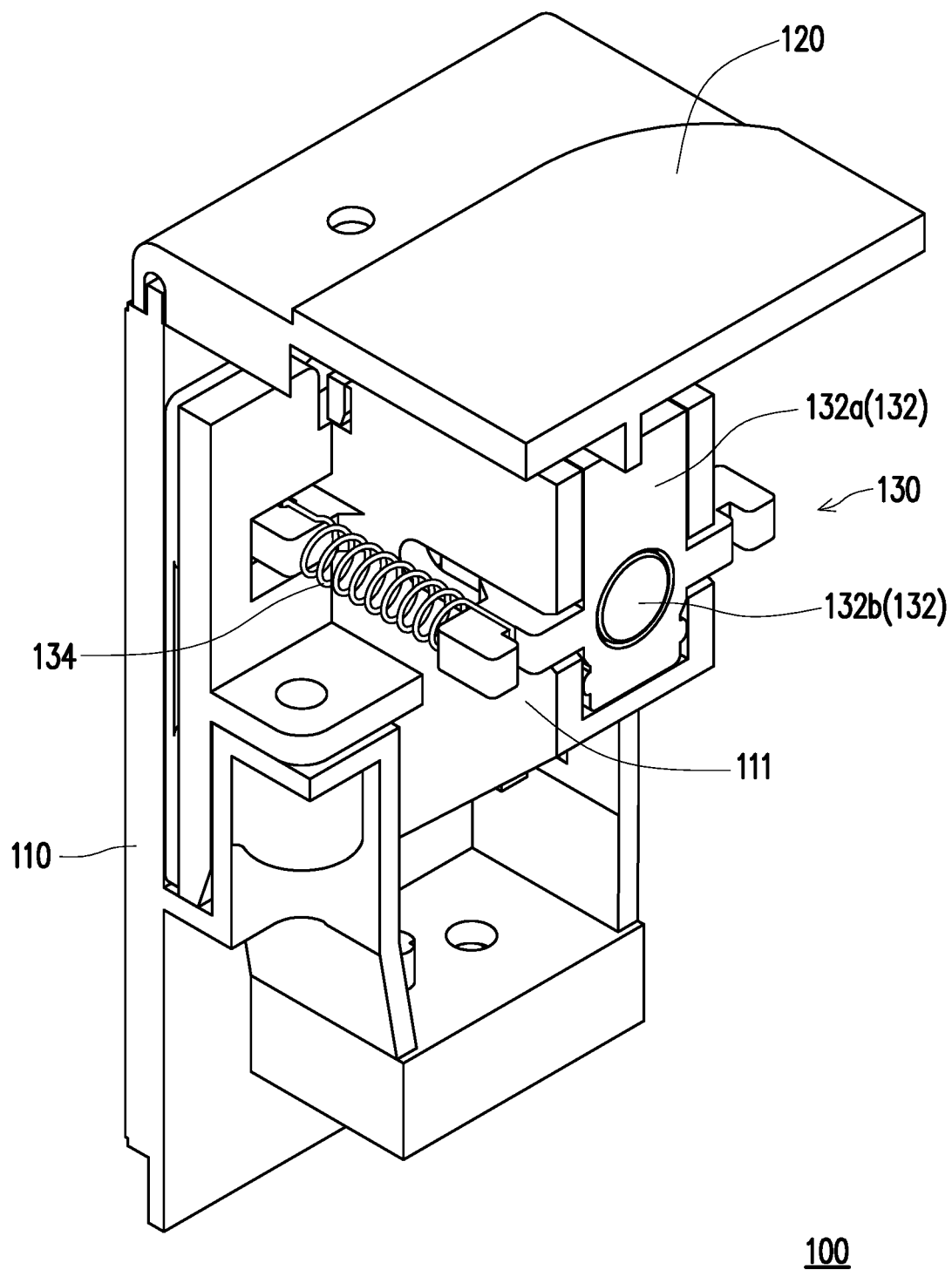
FIG. 1A is a partial schematic view showing an electronic device according to a first embodiment of the disclosure.

FIG. 1A is a partial schematic view showing an electronic device according to a first embodiment of the disclosure.

Figure 1B:
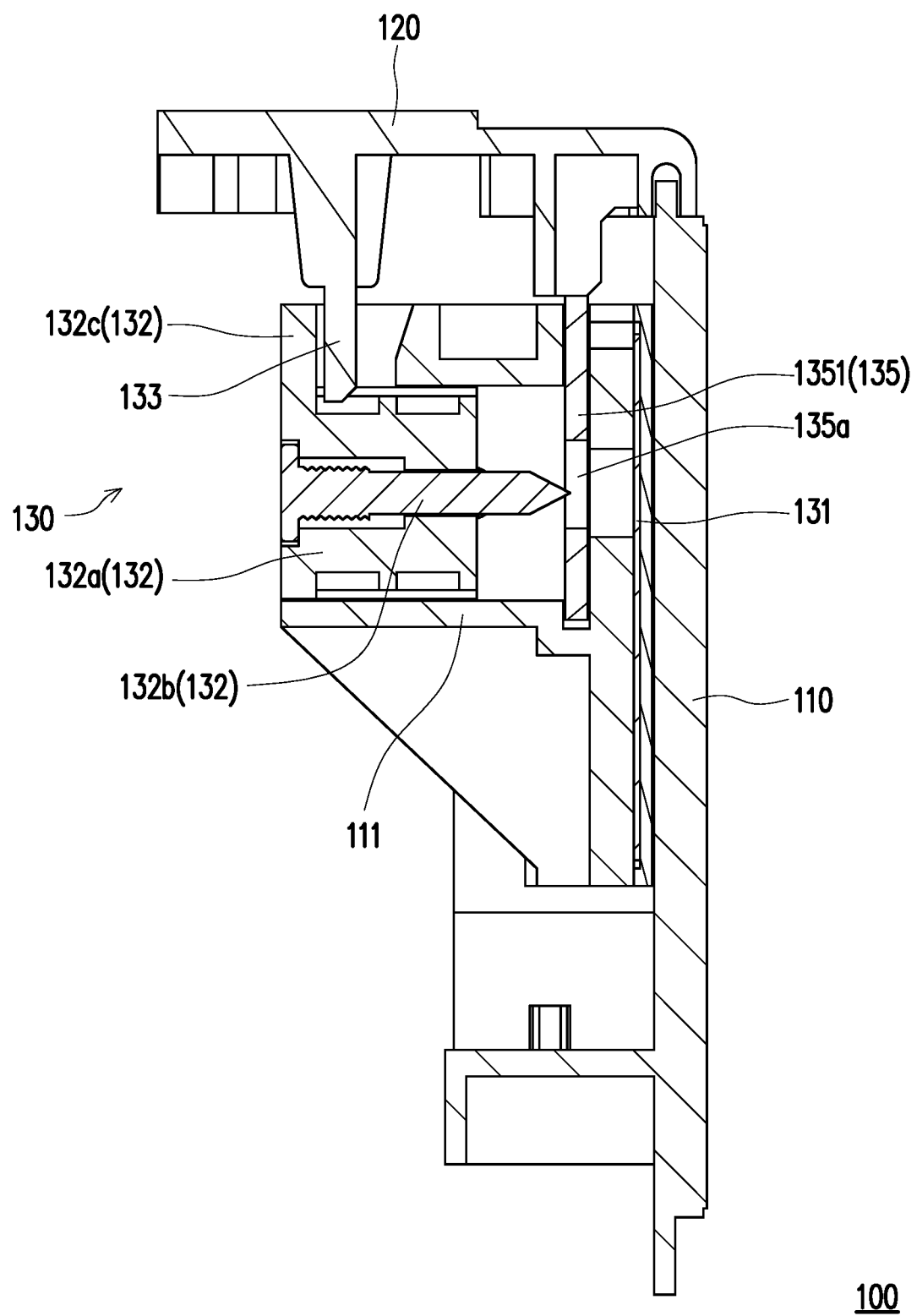
FIG. 1B is a partial schematic cross-sectional view showing the electronic device of FIG. 1A in a first mode.
Figure 1C:
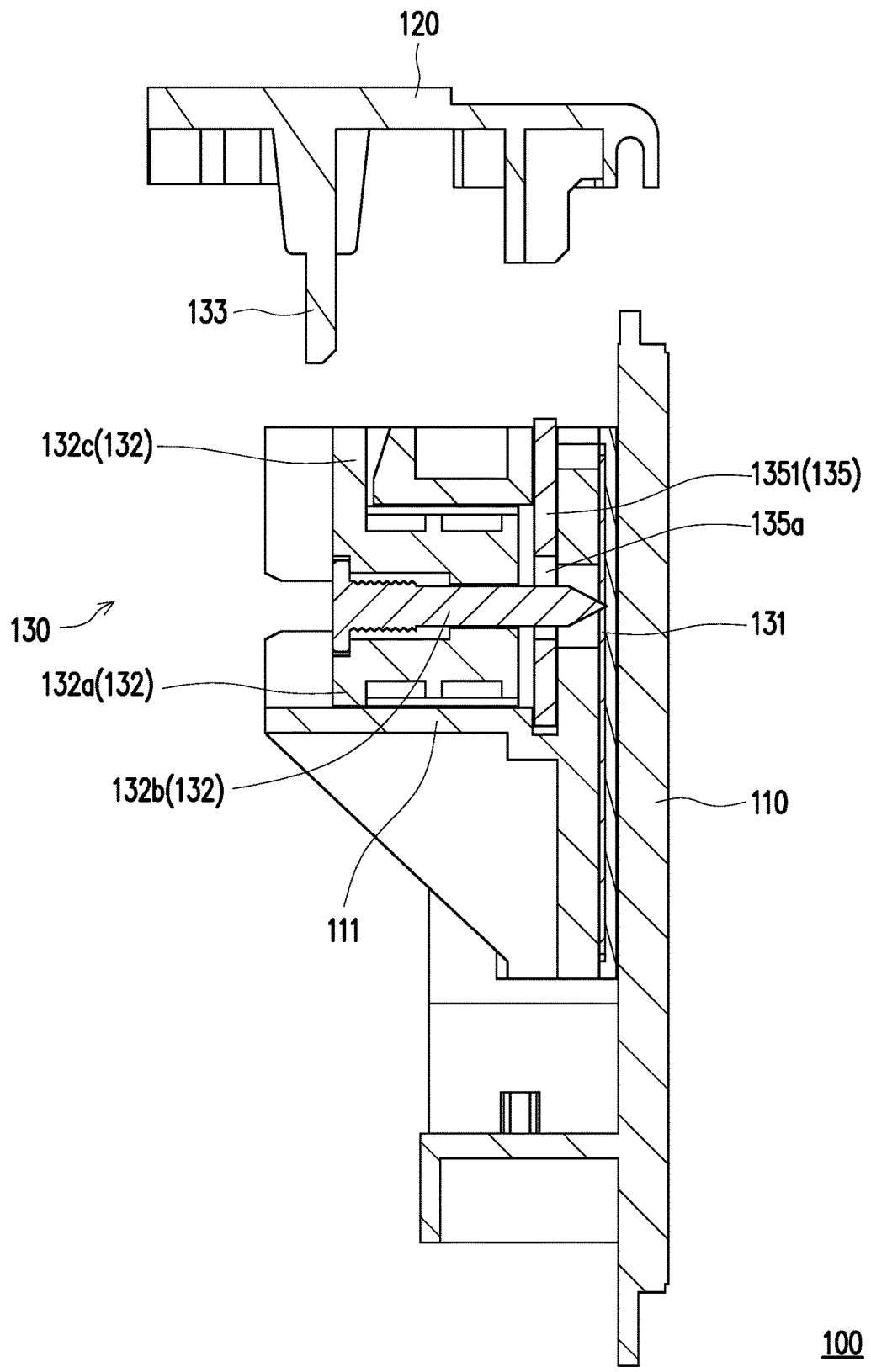
FIG. 1C is a partial schematic cross-sectional view showing the electronic device of FIG. 1A in a second mode.

FIG. 1B is a partial schematic cross-sectional view showing the electronic device of FIG. 1A in a first mode. FIG. 1C is a partial schematic cross-sectional view showing the electronic device of FIG. 1A in a second mode. Referring to FIG. 1A to FIG. 1C, in this embodiment, an electronic device 100 may be a notebook computer, a smartphone, a tablet computer, a hard disk, a server, or other devices used for data computation or data storage, and the electronic device 100 includes a first case 110, a second case 120, and an actuating mechanism 130.

The first case 110 may accommodate electronic components used for data computation or data storage, and the second case 120 may be movably mounted at the first case 110. For example, the second case 120 is mounted at the first case 110 through locking, engagement, adhesion, or other mounting methods to prevent the electronic components mounted in the first case 110 from being exposed to the outside world. The actuating mechanism 130 is mounted between the first case 110 and the second case 120. Based on whether the actuating mechanism 130 is triggered or not, relevant personnel can quickly and accurately determine whether the first case 110 and the second case 120 have been deliberately disassembled and reassembled. Therefore, the electronic device 100 has a good safety protection mechanism.

Specifically, the actuating mechanism 130 includes a target 131, a smasher 132, and a blocker 133. The target 131 may be a sensing chip, a sensing circuit, or a trigger circuit and is disposed in the first case 110. For example, the target 131 is mounted on the inner wall surface of the first case 110. On the other hand, the smasher 132 is movably disposed in the first case 110. The smasher 132 is located at a side of the target 131, and the blocker 133 is movably disposed corresponding to the smasher 132. In the first mode, the smasher 132 is driven by an elastic force and has a tendency to move toward the target 131, but the blocker 133 contacts the smasher 132 and clamps the smasher 132 to prevent the smasher 132 from moving toward the target 131.

As shown in FIG. 1B, the target 131 is located in the moving path of the smasher 132, and the blocker 133 is configured to clamp the smasher 132. At this time, the blocker 133 mechanically interferes with the smasher 132 to prevent the smasher 132 from being moved toward the target 131 by the elastic force. Specifically, one end of the blocker 133 is connected to the second case 120, and the blocker 133 protrudes from the inner wall surface of the second case 120. The other end of the blocker 133 extends into the first case 110.

As shown in FIG. 1A and FIG. 1B, the actuating mechanism 130 further includes an elastic component 134. The elastic component 134 may include a tension spring and is disposed in the first case 110. The two ends of the elastic component 134 are respectively connected to the smasher 132 and the first case 110. In the first mode, the elastic component 134 is stretched, and the smasher 132 is driven by the elastic restoring force of the elastic component 134 and has a tendency to move toward the target 131. However, since the blocker 133 contacts the smasher 132 and clamps the smasher 132, the elastic component 134 temporarily cannot restore to the state before the elastic deformation.

As shown in FIG. 1C, when the blocker 133 moves to a position where the clamping to the smasher 132 is released, the elastic component 134 provides an elastic force (i.e., the elastic restoring force of the elastic component 134) to drive the smasher 132 to move toward the target 131 and smash the target 131. In the second mode, the target 131 is smashed and damaged. In other words, if the first case 110 and the second case 120 have been deliberately disassembled and reassembled, the target 131 will also have been damaged. Therefore, without disassembling the first case 110 and the second case 120, the relevant personnel may perform reading on the target 131 from outside the electronic device 100 through a reader. If the reading fails, it means that the electronic device 100 has been deliberately disassembled and the target 131 has been damaged.

In another embodiment, if the target 131 is smashed and damaged by the smasher 132, the target 131 may send a signal to a terminal device of the relevant personnel to warn the relevant personnel.

Referring to FIG. 1A to FIG. 1C, in this embodiment, the smasher 132 may include a sliding base 132a, a striker 132b, and a limiting part 132c. The striker 132b is mounted and fixed at the sliding base 132a, and the limiting part 132c protrudes from the sliding base 132a. In the first mode, the blocker 133 is located in the moving path of the limiting part 132c (or the blocker 133 blocks the moving path of the limiting part 132c) to clamp the smasher 132. When the second case 120 is disassembled from the first case 110, the blocker 133 moves out of the moving path of the limiting part 132c, the blocker 133 moves to a position where the clamping to the smasher 132 is released, and the smasher 132 is driven by the elastic force to move toward the target 131, so that the striker 132b smashes the target 131.

For example, the first case 110 is provided with a guiding base 111. The guiding base 111 protrudes from the inner wall surface of the first case 110, and the smasher 132 is slidably disposed at the guiding base 111. Specifically, the guiding base 111 can ensure that the smasher 132 moves toward the target 131 or away from the target 131 on a specific path, so as to avoid deviation of the moving path of the smasher 132.

Figure 1D:
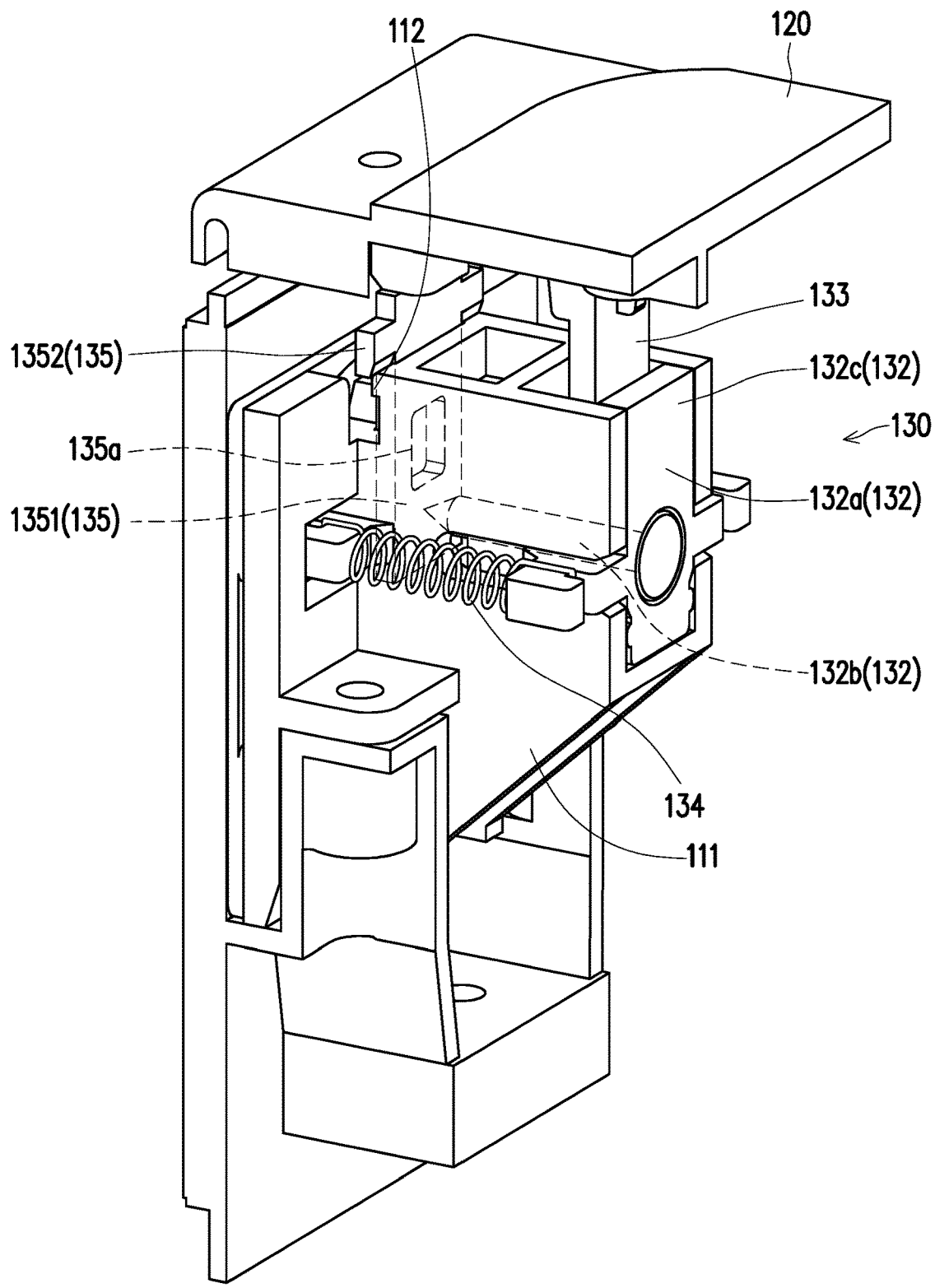
FIG. 1D is a partial schematic view showing a first case and a second case of FIG. 1A before mounting.

FIG. 1D is a partial schematic view showing the first case and the second case of FIG. 1A before mounting. Referring to FIG. 1D, in this embodiment, the actuating mechanism 130 further includes a door plate 135. The door plate 135 is disposed in the first case 110 and is movably disposed between the target 131 and the smasher 132. Before the second case 120 is mounted at the first case 110, the door plate 135 blocks the moving path of the smasher 132 toward the target 131, and the smasher 132 contacts the door plate 135. Therefore, even though the blocker 133 has not blocked the moving path of the limiting part 132c, the door plate 135 can prevent the smasher 132 from being moved toward the target 131 by the elastic force.

Specifically, the door plate 135 has a through hole 135a. When the smasher 132 contacts the door plate 135, the through hole 135a is misaligned with the smasher 132 and the target 131. On the other hand, the first case 110 has a locking protrusion 112, and the locking protrusion 112 may be located on the guiding base 111. The guiding base 111 has a slot for the door plate 135 to be inserted therein. The door plate 135 includes a body 1351 and an extension arm 1352 connected the body 1351, and the through hole 135a penetrates the body 1351.

Before the second case 120 is mounted at the first case 110, the extension arm 1352 of the door plate 135 abuts against the locking protrusion 112. The locking protrusion 112 of the first case 110 is configured to block the door plate 135 from sliding downward to ensure that the smasher 132 contacts the body 1351 and that the through hole 135a is misaligned with the smasher 132 and the target 131. With the through hole 135a misaligned with the smasher 132 and the target 131, the body 1351 of the door plate 135 blocks the moving path of the smasher 132 toward the target 131. Therefore, even though the blocker 133 has not blocked the moving path of the limiting part 132c, the body 1351 of the door plate 135 can prevent the smasher 132 from being moved toward the target 131 by the elastic force.

In the process of mounting the second case 120 at the first case 110, the door plate 135 is pressed down by the second case 120, so that the extension arm 1352 passes by the locking protrusion 112, and the through hole 135a is aligned with the smasher 132 and the target 131, as shown in FIG. 1B.

As shown in FIG. 1B, the smasher 132 does not contact the body 1351, and the through hole 135a, the smasher 132, and the target 131 are located on the same straight line (i.e., the through hole 135a is aligned with the smasher 132 and the target 131). When the second case 120 is disassembled from the first case 110, the blocker 133 moves out of the moving path of the limiting part 132c, the smasher 132 is driven by the elastic force to move toward the target 131, and the striker 132b moves through the through hole 135a and then smashes the target 131, as shown in FIG. 1C.

In the following, other embodiments will be described as examples. The differences among the embodiments will be mainly described, and the similar or same design principles in the embodiments will be omitted.

Figure 2A:
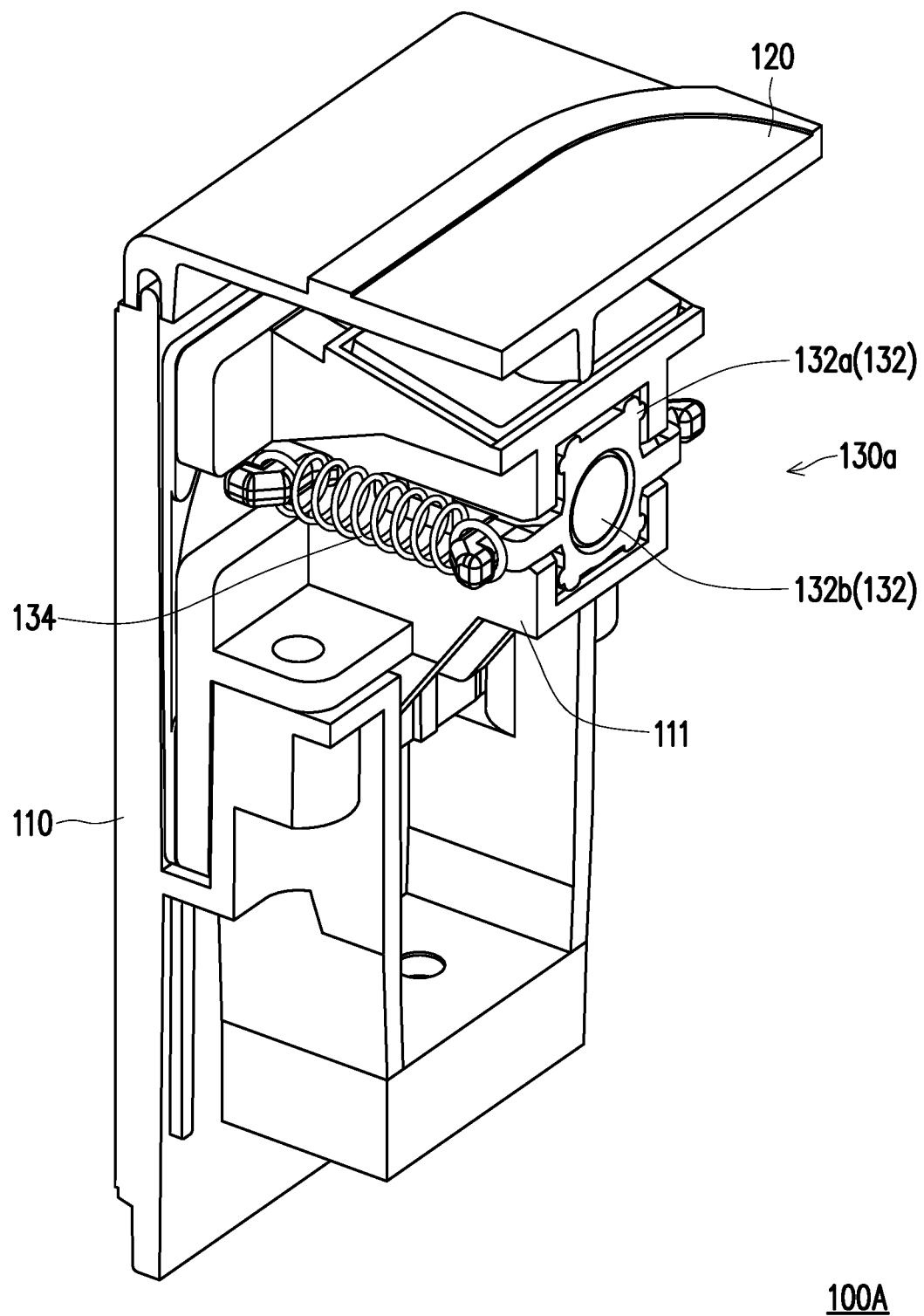
FIG. 2A is a partial schematic view showing an electronic device according to a second embodiment of the disclosure.
Figure 2B:
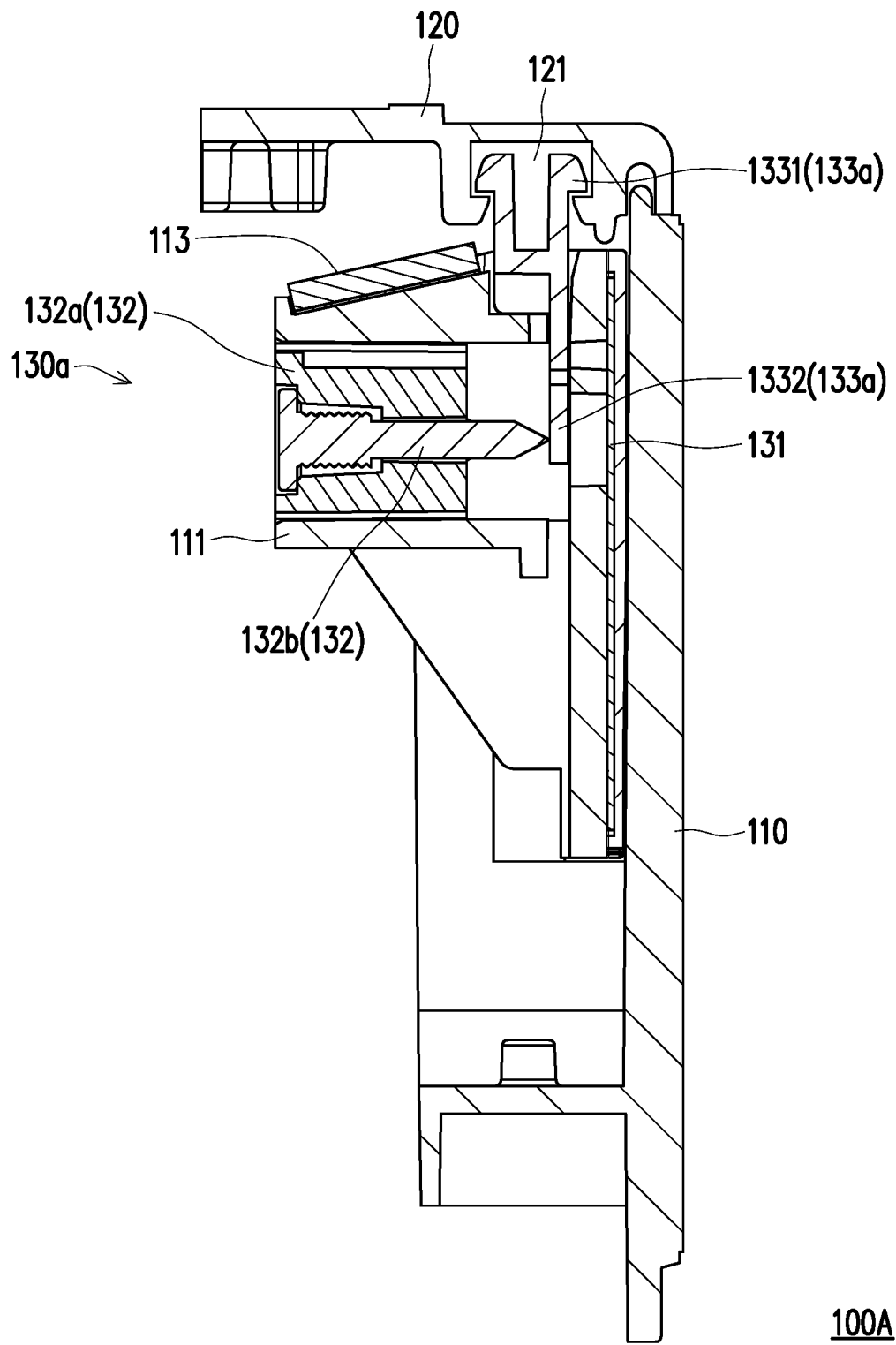
FIG. 2B is a partial schematic cross-sectional view showing the electronic device of FIG. 2A in a first mode.
Figure 2C:
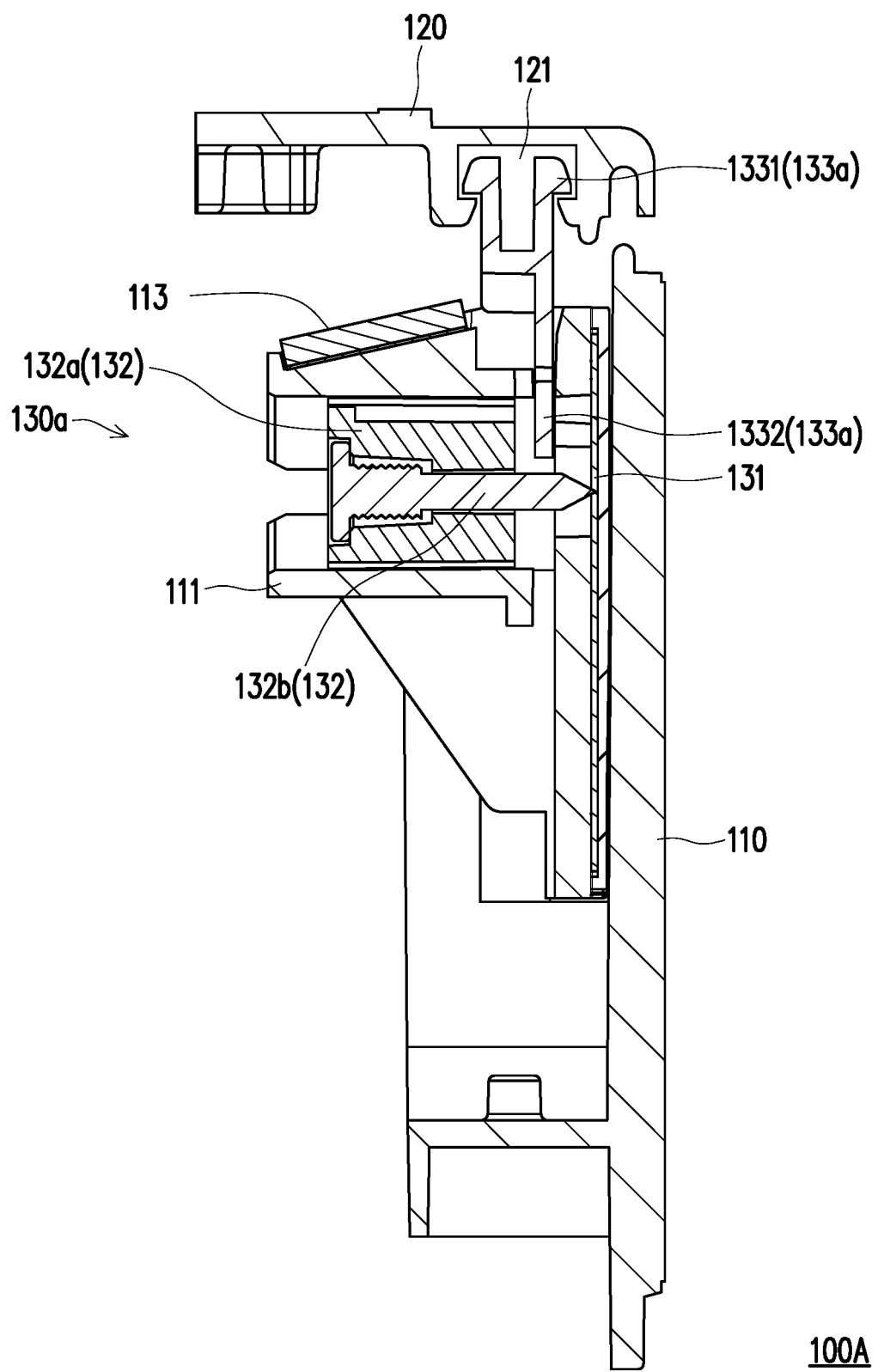
FIG. 2C is a partial schematic cross-sectional view showing the electronic device of FIG. 2A in a second mode.
Figure 2D:
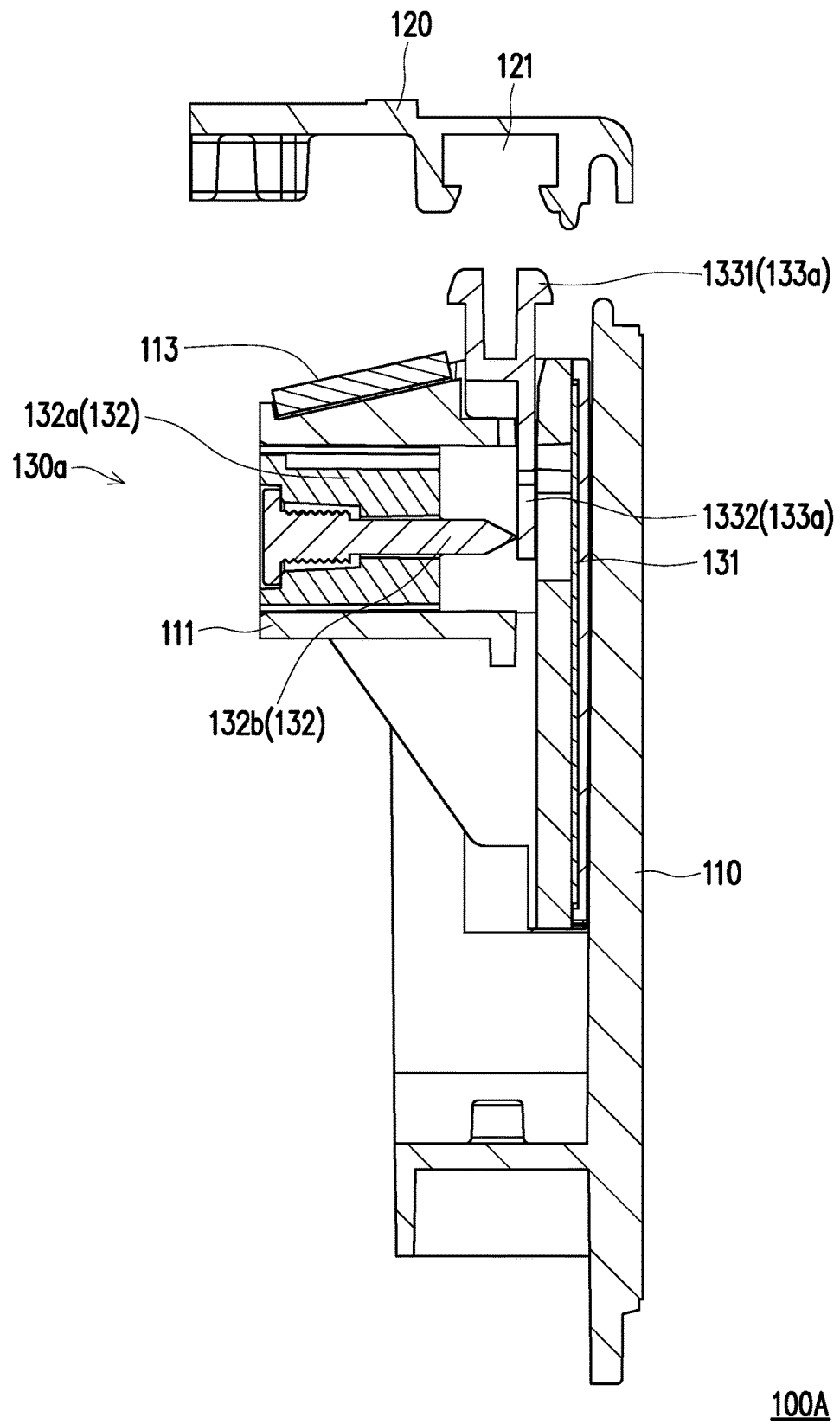
FIG. 2D is a partial schematic cross-sectional view showing a first case and a second case of FIG. 2A before mounting.

FIG. 2A is a partial schematic view showing an electronic device according to a second embodiment of the disclosure. FIG. 2B is a partial schematic cross-sectional view showing the electronic device of FIG. 2A in a first mode. FIG. 2C is a partial schematic cross-sectional view showing the electronic device of FIG. 2A in a second mode. FIG. 2D is a partial schematic cross-sectional view showing a first case and a second case of FIG. 2A before mounting. Referring to FIG. 2A to FIG. 2C, the main difference between an electronic device 100A of this embodiment and the electronic device 100 of the first embodiment lies in the design of the actuating mechanism.

In this embodiment, a blocker 133a of an actuating mechanism 130a is movably disposed between the target 131 and the smasher 132, and the blocker 133a blocks the moving path of the smasher 132 toward the target 131. The blocker 133a contacts the smasher 132 to clamp the smasher 132 and prevent the smasher 132 from being moved toward the target 131 by the elastic force.

As shown in FIG. 2C, when the blocker 133a moves away from the smasher 132 and moves out of the moving path of the smasher 132 toward the target 131, the blocker 133a moves to a position where the clamping to the smasher 132 is released, and the smasher 132 is driven by the elastic force to move toward the target 131 and smash the target 131.

As shown in FIG. 2B and FIG. 2C, the blocker 133a includes at least one engaging part 1331 and a blocking part 1332. The engaging part 1331 is engaged with an engaging slot 121 of the second case 120, and the blocking part 1332 is movably disposed between the target 131 and the smasher 132. The blocker 133a is configured to move along with the second case 120, so that the blocking part 1332 moves into or out of the moving path of the smasher 132 toward the target 131.

As shown in FIG. 2B, the blocking part 1332 blocks the moving path of the smasher 132 toward the target 131, and the blocking part 1332 contacts the smasher 132 to clamp the smasher 132. As shown in FIG. 2C, the second case 120 is disassembled from the first case 110. When the blocking part 1332 moves along with the second case 120 and moves away from the smasher 132 to a position where the clamping to the smasher 132 is released, the blocking part 1332 moves out of the moving path of the smasher 132 toward the target 131. At this time, the mechanical interference between the blocker 133a and the smasher 132 is released, and the smasher 132 is driven by the elastic force to move toward the target 131 and smash the target 131.

As shown in FIG. 2D, before the second case 120 is mounted at the first case 110, the blocking part 1332 of the blocker 133a blocks the moving path of the smasher 132 toward the target 131, and the blocking part 1332 contacts the smasher 132 to clamp the smasher 132 and prevent the smasher 132 from being moved toward the target 131 by the elastic force. When the second case 120 is mounted at the first case 110, the engaging part 1331 of the blocker 133a is engaged into the engaging slot 121 of the second case 120, as shown in FIG. 2B.

As shown in FIG. 2B, the guiding base 111 has an inclined surface 113 facing the second case 120 configured to prevent an ill-intentioned person from deliberately damaging the actuating mechanism 130a so that the actuating mechanism 130a would not function in the disassembly process of the first case 110 and the second case 120. For example, an ill-intentioned person may drill a hole from outside the second case 120 and, after drilling into the first case 110, further drill through the smasher 132 to prevent the smasher 132 from being moved toward the target 131 by the elastic force. The inclined surface 113 of the guiding base 111 can increase the difficulty in drilling operations (e.g., causing the drill to slip).

Figure 3A:
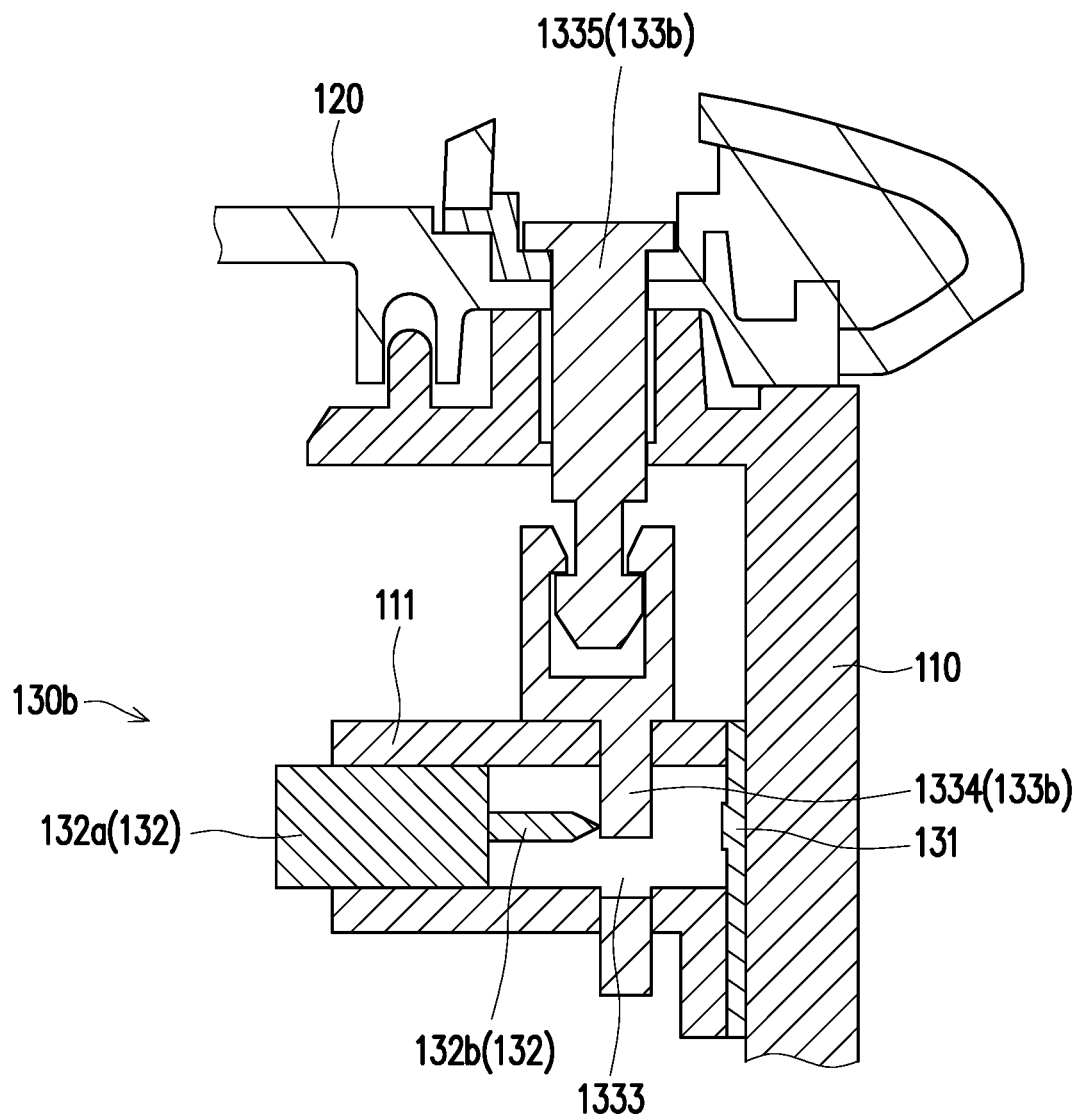
FIG. 3A is a partial schematic cross-sectional view showing an electronic device in a first mode according to a third embodiment of the disclosure.
Figure 3B:
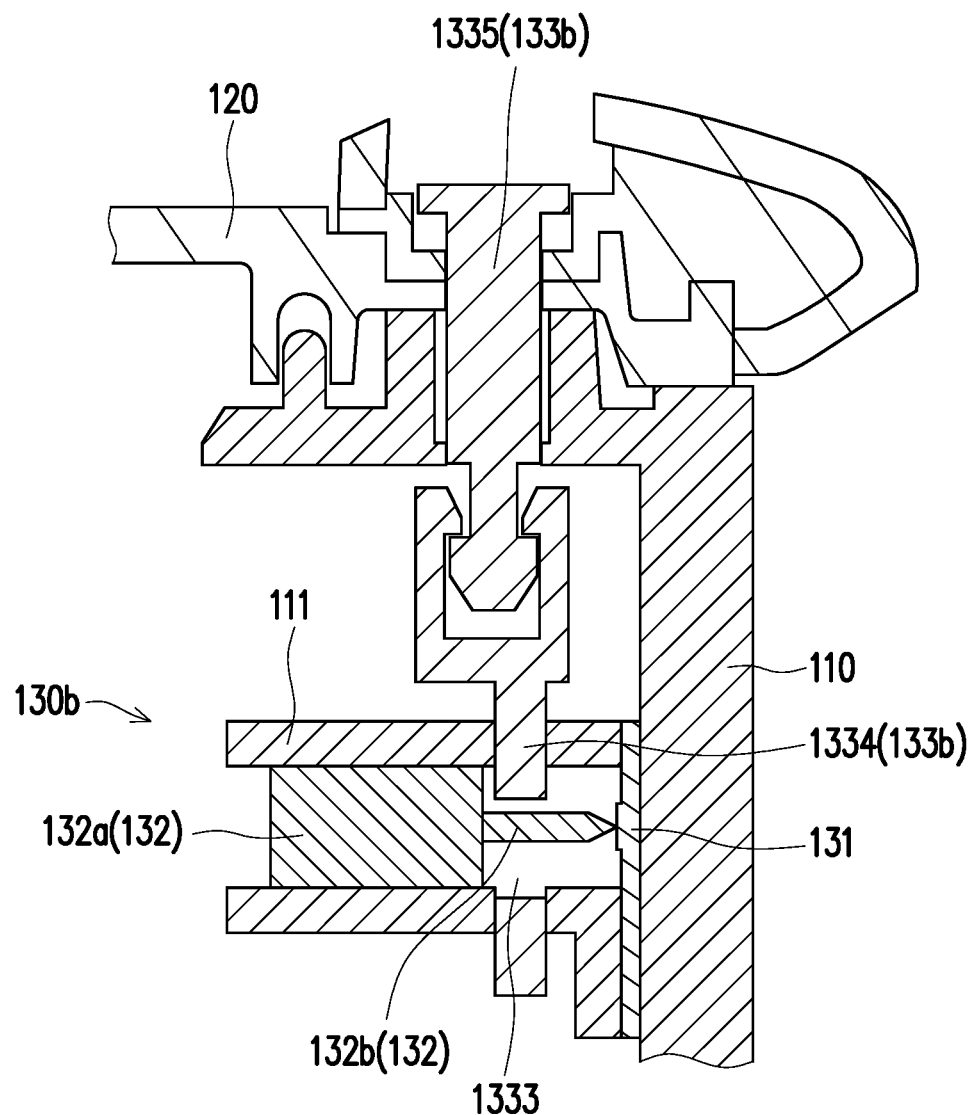
FIG. 3B is a partial schematic cross-sectional view showing the electronic device of FIG. 3A converted to a second mode.
Figure 3C:
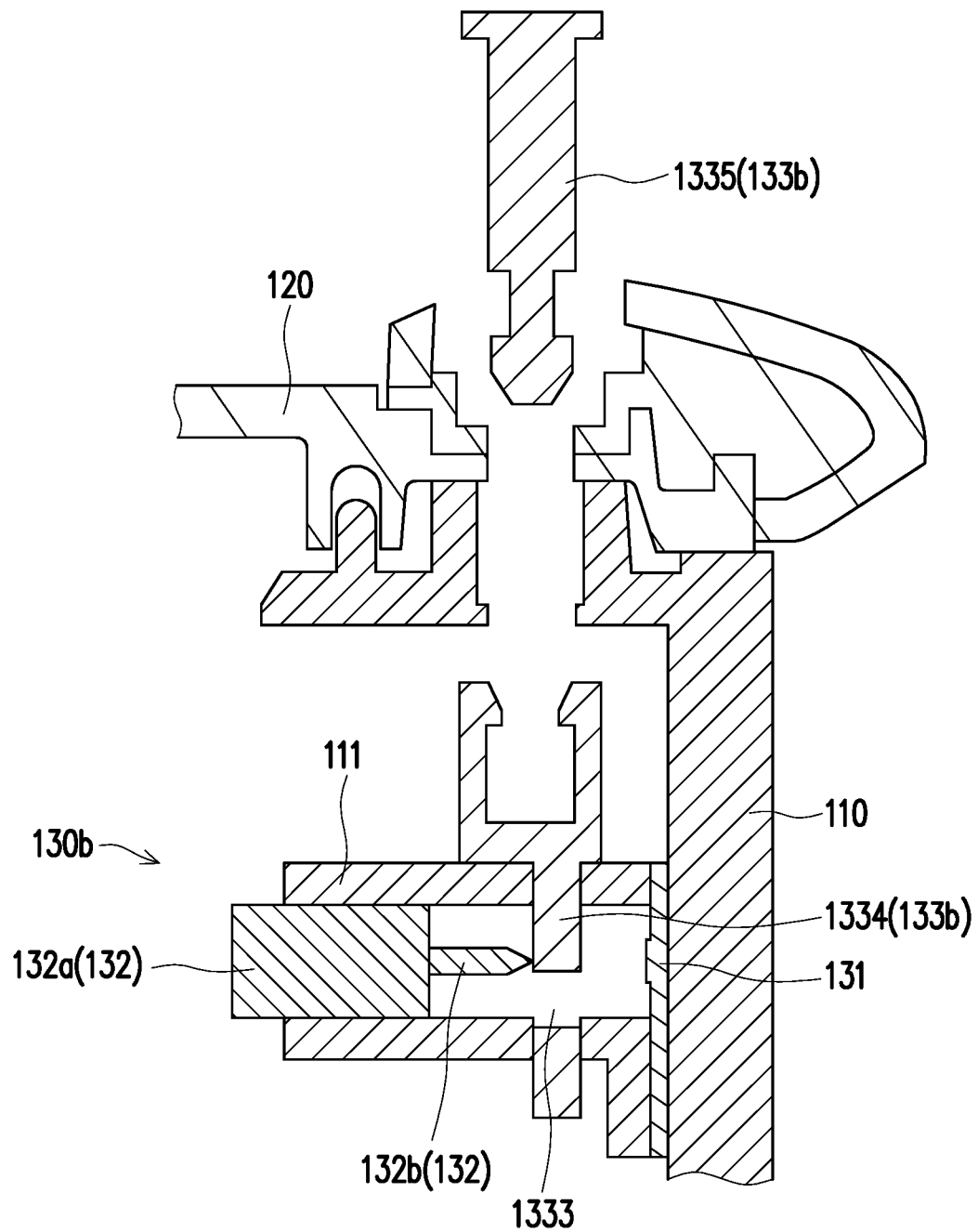
FIG. 3C is a partial schematic cross-sectional view showing a first case and a second case of FIG. 3A before locking.

FIG. 3A is a partial schematic cross-sectional view showing an electronic device in a first mode according to a third embodiment of the disclosure. FIG. 3B is a partial schematic cross-sectional view showing the electronic device of FIG. 3A converted to a second mode. FIG. 3C is a partial schematic cross-sectional view showing a first case and a second case of FIG. 3A before locking. Referring to FIG. 3A and FIG. 3B, the main difference between an electronic device 100B of this embodiment and the electronic device 100 of the first embodiment lies in the design of the actuating mechanism.

In this embodiment, a blocker 133b of an actuating mechanism 130b is movably disposed between the target 131 and the smasher 132, and the blocker 133b has a through hole 1333. When the through hole 1333 is misaligned with the smasher 132 and the target 131, the blocker 133b contacts the smasher 132 to clamp the smasher 132 and prevent the smasher 132 from being moved toward the target 131 by the elastic force. When the blocker 133b moves away from the smasher 132 and moves out of the moving path of the smasher 132 toward the target 131, the blocker 133b moves to a position where the clamping to the smasher 132 is released, the through hole 1333, the smasher 132, and the target 131 are located on the same straight line (i.e., the through hole 1333 is aligned with the smasher 132 and the target 131), and the smasher 132 is driven by the elastic force to move toward the target 131 and smashes the target 131 after moving through the through hole 1333.

Specifically, the blocker 133b includes a blocking part 1334 and a mounting part 1335. The blocking part 1334 is located in the first case 110, and the blocking part 1334 is movably disposed between the target 131 and the smasher 132. The through hole 1333 penetrates the blocking part 1334, and the mounting part 1335 extends into the first case 110 and is engaged with the blocking part 1334. For example, the mounting part 1335 may include a screw configured to lock and fix the first case 110 and the second case 120. On the other hand, one end of the mounting part 1335 facing the blocking part 1334 may be a locking protrusion, and one end of the blocking part 1334 facing the mounting part 1335 may be an engaging slot which works with the locking protrusion.

As shown in FIG. 3A, when the mounting part 1335 is locked to the second case 120 and the first case 110, the locking protrusion of the mounting part 1335 is engaged into the engaging slot of the blocking part 1334. On the other hand, the blocking part 1334 contacts the smasher 132 to clamp the smasher 132, and the through hole 1333 is misaligned with the smasher 132 and the target 131.

As shown in FIG. 3B, when the mounting part 1335 is removed from the second case 120 and the first case 110, the blocking part 1334 moves along with the mounting part 1335 so that the through hole 1333 is aligned with the smasher 132 and the target 131. At this time, the blocking part 1334 moves to a position where the clamping to the smasher 132 is released, and the smasher 132 is driven by the elastic force to move toward the target 131 and smashes the target 131 after moving through the through hole 1333.

Referring to FIG. 3C, before the mounting part 1335 is locked into the second case 120 and the first case 110, the blocking part 1334 blocks the moving path of the smasher 132 toward the target 131, and the blocking part 1334 contacts the smasher 132 to clamp the smasher 132 and prevent the smasher 132 from being moved toward the target 131 by the elastic force.

In summary of the above, the electronic device of the disclosure is integrated with the actuating mechanism, and based on whether the actuating mechanism is triggered or not, the relevant personnel can quickly and accurately determine whether the first case and the second case have been deliberately disassembled and reassembled. Therefore, the electronic device has a good safety protection mechanism. Furthermore, when the second case is mounted and fixed at the first case, the actuating mechanism is not triggered. Once the second case is disassembled from the first case, the actuating mechanism is triggered and the target is damaged through the smasher. In other words, if the first case and the second case have been deliberately disassembled and reassembled, the target will also have been damaged. Therefore, without disassembling the first case and the second case, the relevant personnel can perform reading on the target from outside the electronic device through a reader. If the reading fails, it means that the electronic device has been deliberately disassembled and the target has been damaged.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An actuating mechanism comprising: a first case; a second case movably mounted at the first case; a target disposed in the first case; a smasher movably disposed in the first case and located at a side of the target; an elastic component providing an elastic force to drive the smasher to move toward the target, wherein two ends of the elastic component are respectively connected to the smasher and the first case; and a blocker movably disposed corresponding to the smasher, wherein one end of the blocker is connected to the second case and another end of the blocker is located in the first case, wherein when the blocker contacts the smasher, the blocker clamps the smasher, and when the blocker moves to a position where the clamping to the smasher is released, the smasher is driven by the elastic force to move toward the target and smash the target; and the blocker is movably disposed between the target and the smasher, and the blocker has a through hole, wherein in one mode, the blocker contacts the smasher to clamp the smasher, and the through hole is misaligned with the smasher and the target, and in another mode, when the blocker moves so that the through hole is aligned with the smasher and the target, the blocker moves to a position where the clamping to the smasher is released, and the smasher is driven by the elastic force to move toward the target and smashes the target after moving through the through hole.

2. The actuating mechanism according to claim 1, wherein the smasher comprises a limiting part, and the blocker is located in a moving path of the limiting part to clamp the smasher, wherein
when the blocker moves out of the moving path of the limiting part, the blocker moves to a position where the clamping to the smasher is released, and the smasher is driven by the elastic force to move toward the target and smash the target.

3. The actuating mechanism according to claim 1, further comprising:
a door plate movably disposed between the target and the smasher, wherein the door plate has a through hole, wherein
in one mode, the smasher contacts the door plate, and the through hole is misaligned with the smasher and the target, and
in another mode, the through hole is aligned with the smasher and the target.

4. The actuating mechanism according to claim 1, wherein the blocker is movably disposed between the target and the smasher, wherein
in one mode, the blocker contacts the smasher to clamp the smasher, and
in another mode, when the blocker moves away from the smasher to a position where the clamping to the smasher is released, the smasher is driven by the elastic force to move toward the target and smash the target.

5. An electronic device comprising: a first case; a second case movably mounted at the first case; and an actuating mechanism comprising: a target disposed in the first case; a smasher movably disposed in the first case and located at a side of the target; an elastic component, wherein two ends of the elastic component are respectively connected to the smasher and the first case, and the elastic component provides an elastic force to drive the smasher to move toward the target; and a blocker, wherein one end of the blocker is connected to the second case and another end of the blocker is located in the first case, and the blocker is movably disposed corresponding to the smasher, wherein when the blocker contacts the smasher, the blocker clamps the smasher, and when the blocker moves along with the second case to a position where the clamping to the smasher is released, the smasher is driven by the elastic force to move toward the target and smash the target; and the blocker is movably disposed between the target and the smasher, and the blocker has a through hole, wherein in one mode, the blocker contacts the smasher to clamp the smasher, and the through hole is misaligned with the smasher and the target, and in another mode, when the blocker moves so that the through hole is aligned with the smasher and the target, the blocker moves to a position where the clamping to the smasher is released, and the smasher is driven by the elastic force to move toward the target and smashes the target after moving through the through hole.

6. The electronic device according to claim 5, wherein the smasher comprises a limiting part, and the blocker is located in a moving path of the limiting part to clamp the smasher, wherein
when the second case is disassembled from the first case, the blocker moves out of the moving path of the limiting part, the blocker moves to a position where the clamping to the smasher is released, and the smasher is driven by the elastic force to move toward the target and smash the target.

7. The electronic device according to claim 5, wherein the actuating mechanism further comprises:
a door plate disposed in the first case, wherein the door plate is movably disposed between the target and the smasher, and the door plate has a through hole, wherein
in one mode, the smasher contacts the door plate, and the through hole is misaligned with the smasher and the target, and
in another mode, the through hole is aligned with the smasher and the target.

8. The electronic device according to claim 7, wherein the first case has a locking protrusion, the door plate comprises a body and an extension arm connected to the body, and the through hole penetrates the body, wherein
in the one mode, the extension arm abuts against the locking protrusion, the smasher contacts the body, and the through hole is misaligned with the smasher and the target, and
in the another mode, the extension arm passes by the locking protrusion, and the through hole is aligned with the smasher and the target.

9. The electronic device according to claim 5, wherein the blocker is movably disposed between the target and the smasher, wherein
in one mode, the blocker contacts the smasher to clamp the smasher, and
in another mode, when the blocker moves away from the smasher to a position where the clamping to the smasher is released, the smasher is driven by the elastic force to move toward the target and smash the target.

10. The electronic device according to claim 9, wherein the blocker comprises at least one engaging part and a blocking part, the at least one engaging part is engaged with the second case, and the blocking part is movably disposed between the target and the smasher, wherein
in the one mode, the blocking part contacts the smasher to clamp the smasher, and
in the another mode, the second case is disassembled from the first case, and when the blocking part moves along with the second case to move away from the smasher to a position where the clamping to the smasher is released, the smasher is driven by the elastic force to move toward the target and smash the target.

11. The electronic device according to claim 5, wherein the blocker comprises a blocking part and a mounting part, and the blocking part is located in the first case, wherein the blocking part is movably disposed between the target and the smasher, the through hole penetrates the blocking part, and the mounting part extends into the first case and is engaged with the blocking part, wherein
in the one mode, the mounting part is locked to the second case and the first case, the blocking part contacts the smasher to clamp the smasher, and the through hole is misaligned with the smasher and the target, and
in the another mode, the mounting part is removed from the second case and the first case, the blocking part moves along with the mounting part so that the through hole is aligned with the smasher and the target, the blocking part moves to a position where the clamping to the smasher is released, and the smasher is driven by the elastic force to move toward the target and smashes the target after moving through the through hole.

* * * * *